United States Patent Office.

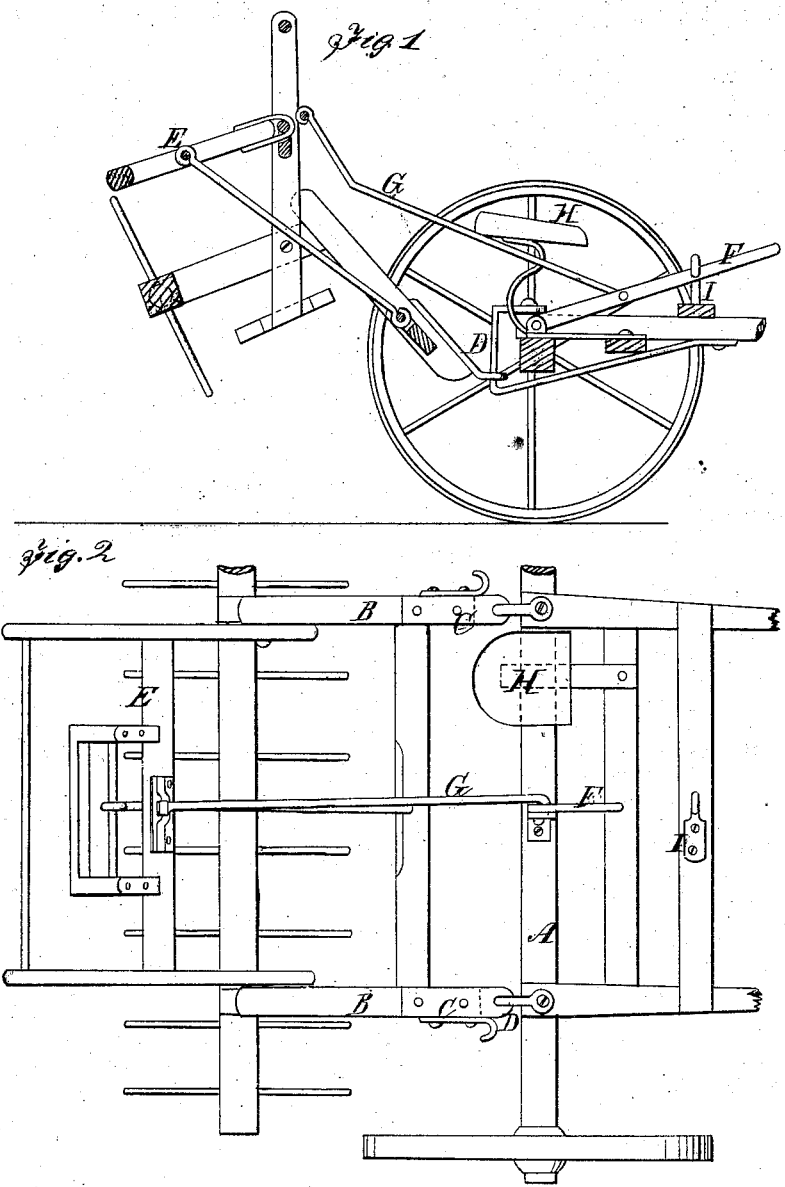

THOMAS J. WEST, OF ALFRED CENTRE, NEW YORK.

Letters Patent No. 93,777, dated August 17, 1869.

IMPROVEMENT IN HORSE-RAKES.

The Schedule referred to in these Letters Patent and making part of the same.

*To all whom it may concern:*

Be it known that I, THOMAS J. WEST, of Alfred Centre, in the county of Allegany, and State of New York, have invented a new and useful Improvement in Horse Hay-Rakes; and I do hereby declare that the following is a full, clear, and exact description thereof, which will enable others skilled in the art to make and use the same, reference being had to the accompanying drawing, forming part of this specification.

The object of this invention is to provide a sulky-attachment to the common horse hay-rake, and suitable operating-mechanism, whereby the rake may be manipulated by the attendant while sitting on the seat of the sulky, in advance of the rake.

Figure 1 represents a longitudinal sectional elevation of a hay-rake attached to a sulky, and suspended therefrom, so as to be transported over the ground.

Figure 2 represents a plan-view in the working-position.

Similar letters of reference indicate corresponding parts.

To the axle A of a sulky, I attach the draw-bars B of an ordinary horse hay-rake, by means of eye-plates C and bent rods D, so arranged as to permit vertical play of the ends of the draw-bars, to facilitate the working of the same.

To the cross-bar E of the handles, I connect an operating-lever, F, by a connecting-rod, G, the said lever being hinged to the axle as a fulcrum, with the free end rising up within convenient reach of the operator, sitting on the seat H.

By means of this lever, the rake may be manipulated in the same manner as by the ordinary handles. For causing the teeth to work closely to the ground, the said lever is moved forward, and still further forward, to cause the teeth to catch for turning, and for elevating the teeth to pass over obstructions, this lever is moved in the other direction.

The rake may be elevated entirely off the ground by moving the lever F forward and engaging it with the hook I on the front of the sulky.

Having thus described my invention,

What I claim as new, and desire to secure by Letters Patent, is—

The draw-bars B, connected to the sulky, and the handles of the rake connected to the lever F, hinged to the axle, and arranged for manipulating the rake, and for engaging with the hook I, for supporting the rake for transportation, all substantially as specified.

THOMAS J. WEST.

Witnesses:
A. B. COLLINS,
IRA B. CRANDALL.